(12) United States Patent
Aida (10) Patent No.: US 8,764,147 B2
(45) Date of Patent: Jul. 1, 2014

(54) INKJET PRINTHEAD AND PRINTING APPARATUS

(75) Inventor: Takahiro Aida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 13/369,673

(22) Filed: Feb. 9, 2012

(65) Prior Publication Data

US 2012/0212528 A1    Aug. 23, 2012

(30) Foreign Application Priority Data

Feb. 17, 2011    (JP) .................................. 2011-032627

(51) Int. Cl.
*B41J 29/38*    (2006.01)
*B41J 2/045*    (2006.01)

(52) U.S. Cl.
CPC ............ *B41J 2/0458* (2013.01); *B41J 2/04565* (2013.01); *B41J 2/04596* (2013.01); *B41J 2/04585* (2013.01)
USPC .......................................................... 347/11

(58) Field of Classification Search
CPC .. B41J 2/04506; B41J 2/04528; B41J 2/0458; B41J 2/04585; B41J 2/04596; B41J 2/04565
USPC ................. 347/9–11, 56, 57, 60, 61
See application file for complete search history.

(56) References Cited

U.S. PATENT DOCUMENTS 6,394,571 B1 *  5/2002  Yano et al. ...................... 347/17
6,767,080 B2   7/2004  Kanematsu

FOREIGN PATENT DOCUMENTS

JP           8-156256 A      6/1996
JP         2003-89196 A      3/2003

* cited by examiner

*Primary Examiner* — An Do
(74) *Attorney, Agent, or Firm* — Fitzpatrick, Cella, Harper & Scinto

(57) ABSTRACT

The number of head contacts, which increases along with an increase in the number of ink colors and nozzles used in a printhead and the length of the printhead, can be decreased. To accomplish this, a reception unit, which receives a serialized control parameter having an identification code indicating a normal drive pulse for discharging ink or a pulse short enough not to discharge ink, is arranged on the head substrate of a printhead. Further, a normal pulse generation unit, which generates the normal drive pulse based on a received control parameter, and a short pulse generation unit, which generates the short pulse based on a received control parameter, are arranged on the head substrate. Based on the identification code of the control parameter, it is controlled to output the normal drive pulse or short pulse.

4 Claims, 5 Drawing Sheets

INKJET PRINTHEAD AND PRINTING APPARATUS

BACKGROUND OF THE INVENTION

1. Field of the Invention

The present invention relates to an inkjet printhead which prints by discharging ink droplets, and a printing apparatus.

2. Description of the Related Art

In inkjet printing using an inkjet printhead (to be referred to as a printhead), the discharge amount during printing varies due to variations of the head temperature, and unevenness appears in the image density. As an arrangement for suppressing occurrence of the density unevenness, there is proposed a divided-pulse width modulation driving method of supplying a divided pulse as a drive pulse to be applied to a heating element (heater) (see Japanese Patent Laid-Open No. 8-156256).

According to this method, a preheat pulse having a variable pulse width is applied, and then a main heat pulse is applied to drive the heating element after the interval time. A preheat pulse P1 is mainly used to control the ink temperature within the nozzle, and its pulse width is changed depending on a temperature detected by the temperature sensor of the printhead, or the like. Also, the preheat pulse P1 is used for heating the heater to an extent that ink is not discharged. An interval time P2 is a predetermined time interval set to prevent the preheat pulse and main heat pulse from mutually interfering with each other. By setting the interval time P2, the temperature distribution of ink within the nozzle is made uniform. A main heat pulse P3 is used to generate bubbling by the heating element and discharge an ink droplet from the orifice. The divided-pulse width modulation driving method can considerably reduce density variations and density unevenness caused by variations of the discharge amount during printing.

However, ink is not always discharged using all nozzles during printing. For example, printing may be performed using nozzles on only one half side of the printhead or using only part of the printhead in accordance with image data. When nozzles within the printhead are used not uniformly but locally, even the temperature distribution within the printhead is also localized. As a result, partial printing density unevenness occurs.

To prevent this, there is a method in which a heating element for discharging an ink droplet is driven by a pulse short enough not to discharge an ink droplet so that the printhead temperature falls within a predetermined range before or during the print operation (short-pulse heating).

A drive pulse for discharging an ink droplet will be called a normal drive pulse, and a head temperature retaining pulse short enough not to discharge an ink droplet will be called a short pulse.

Japanese Patent Laid-Open No. 8-156256 discloses an arrangement in which, for a nozzle which receives a printing signal, at least one of P1, P2, and P3 defining a drive pulse is modulated based on temperature information of a temperature sensor or the like by a pulse generation circuit for generating the normal drive pulse, and is applied to the heating element. For a nozzle which does not receive a printing signal, a pulse short enough not to cause bubbling is generated as only the drive pulse P1 or P1 and P3, and applied to the heating element.

Japanese Patent Laid-Open No. 2003-89196 discloses an arrangement in which a pulse generation circuit for generating the short pulse is arranged in addition to a pulse generation circuit for generating the normal drive pulse. The pulse generation circuit for generating the short pulse in Japanese Patent Laid-Open No. 2003-89196 generates the short pulse by calculating the logical product of PWM set to the cycle Tc and duty Ton and an internal pulse having an assert time width Tpn corresponding to the short pulse generation count. By the same method as that in Japanese Patent Laid-Open No. 8-156256, a pulse is applied to a nozzle which receives a printing signal. For a nozzle not used in printing, successive short pulses are applied to the heating element by an arbitrary count not to cause bubbling, based on Tpn, Tc, and Ton set by the short pulse generation circuit.

At present, inkjet printing apparatuses (to be referred to as printing apparatuses) need to increase the numbers of ink colors and nozzles used in the printhead and the length of the printhead for higher printing speed and higher image quality. However, to satisfy these requirements, the number of control signals and the signal amount to be supplied to the printhead also increase. For a compact, high-speed apparatus, it is necessary to increase the signal transfer speed and decrease the number of signal lines.

In particular, a larger number of signal lines lead to a larger number of head contacts for finally connecting the head substrate. This inhibits reduction in the cost and profile of the printhead.

To decrease the number of head contacts, control circuits are arranged on respective substrates regarding head control, and head control signals are serialized and transmitted/received between the respective substrates, decreasing the number of signal lines which finally reach the head substrate. In parallel to this, the transfer speed is increased by data transfer using LVDS (Low Voltage Differential Signaling).

A control circuit on the head substrate has a function of deserializing serial data and even a function of controlling generation and supply of a drive pulse to be applied to the heating element of the head. A control circuit arranged on the control substrate of the printing apparatus main body outputs drive pulse control parameters to the control circuit on the head substrate together with a print data signal.

For example, the following parameters are necessary in the presence of two pulse generation circuits, that is, a pulse generation circuit for generating the normal drive pulse and a pulse generation circuit for generating the short pulse, as in Japanese Patent Laid-Open No. 2003-89196. More specifically, generation of the normal drive pulse requires, as control parameters, parameters capable of specifying the time widths of P1, P2, and P3. Generation of the short pulse requires, as control parameters, parameters capable of specifying the cycle Tc, duty Ton, and count Tpn. Since different control parameters are necessary, a signal line for input to the pulse generation circuit for generating the short pulse needs to be arranged in addition to a signal line for input to the pulse generation circuit for generating the normal drive pulse. However, this increases the number of head contacts.

In contrast, the number of control parameters for operating the pulse generation circuit is decreased by controlling the short pulse by the pulse generation circuit for generating the normal drive pulse, as in Japanese Patent Laid-Open No. 8-156256. This is advantageous in minimizing the number of signal lines and the data bit length. This method was needed and desirable at a time when the method disclosed in Japanese Patent Laid-Open No. 8-156256 was proposed. However, to cope with recent increasing numbers of nozzles mounted on the printhead and ink colors used, a demand has arisen for the pattern of a short pulse waveform with high degree of freedom in adjustment of the pulse generation count and the like.

To meet this demand, the pulse generation circuit for generating the normal drive pulse may be expanded so that it can output various waveforms. However, a set of control parameters necessary to set many pulse change points needs to be prepared by the number of change points. Thus, the bit length of input data which defines the control parameter set increases, resulting in a long data transfer time.

SUMMARY OF THE INVENTION

Accordingly, the present invention is conceived as a response to the above-described disadvantages of the conventional art.

For example, an inkjet printhead, and printing apparatus according to this invention are capable of decreasing the number of head contacts with an inkjet printhead while controlling the inkjet printhead at high speed.

According to one aspect of the present invention, there is provided an inkjet printhead comprising: a plurality of heaters; a driving unit configured to drive the plurality of heaters; a reception unit configured to receive, together with an identification code from outside via a single signal line, a first control parameter for discharging ink, or a second control parameter for heating the heater not to discharge ink; a first pulse generation unit configured to generate a pulse to be supplied to the driving unit based on the first control parameter; a second pulse generation unit configured to generate a pulse to be supplied to the driving unit based on the second control parameter; and a supply unit configured to supply the first control parameter to the first pulse generation unit and the second control parameter to the second pulse generation unit based on the identification code.

According to another aspect of the present invention, there is provided a printing apparatus including the above inkjet printhead, comprising: a generation unit configured to generate the first control parameter and the second control parameter; and a transfer unit configured to serially transfer the first control parameter or the second control parameter generated by the generation unit to the inkjet printhead using a single signal line.

The invention is particularly advantageous since control parameters necessary to generate a double pulse or short pulse can be communicated via a single signal line, only a bit for adding an identification code is added and the transfer signal amount or the number of necessary signal lines does not increase. The number of head contacts of the inkjet printhead does not increase, which contributes to downsizing. The transfer signal amount does not greatly increase, so the data transfer time does not become longer, contributing to even high-speed control.

Further features of the present invention will become apparent from the following description of exemplary embodiments (with reference to the attached drawings).

DESCRIPTION OF THE EMBODIMENTS

An exemplary embodiment of the present invention will now be described in detail in accordance with the accompanying drawings.

In this specification, the terms "print" and "printing" not only include the formation of significant information such as characters and graphics, but also broadly include the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, a "printing element" (to be also referred to as a "nozzle") includes an ink orifice or a liquid channel communicating with it, and an element for generating energy used to discharge ink, unless otherwise specified.

Figure 1:
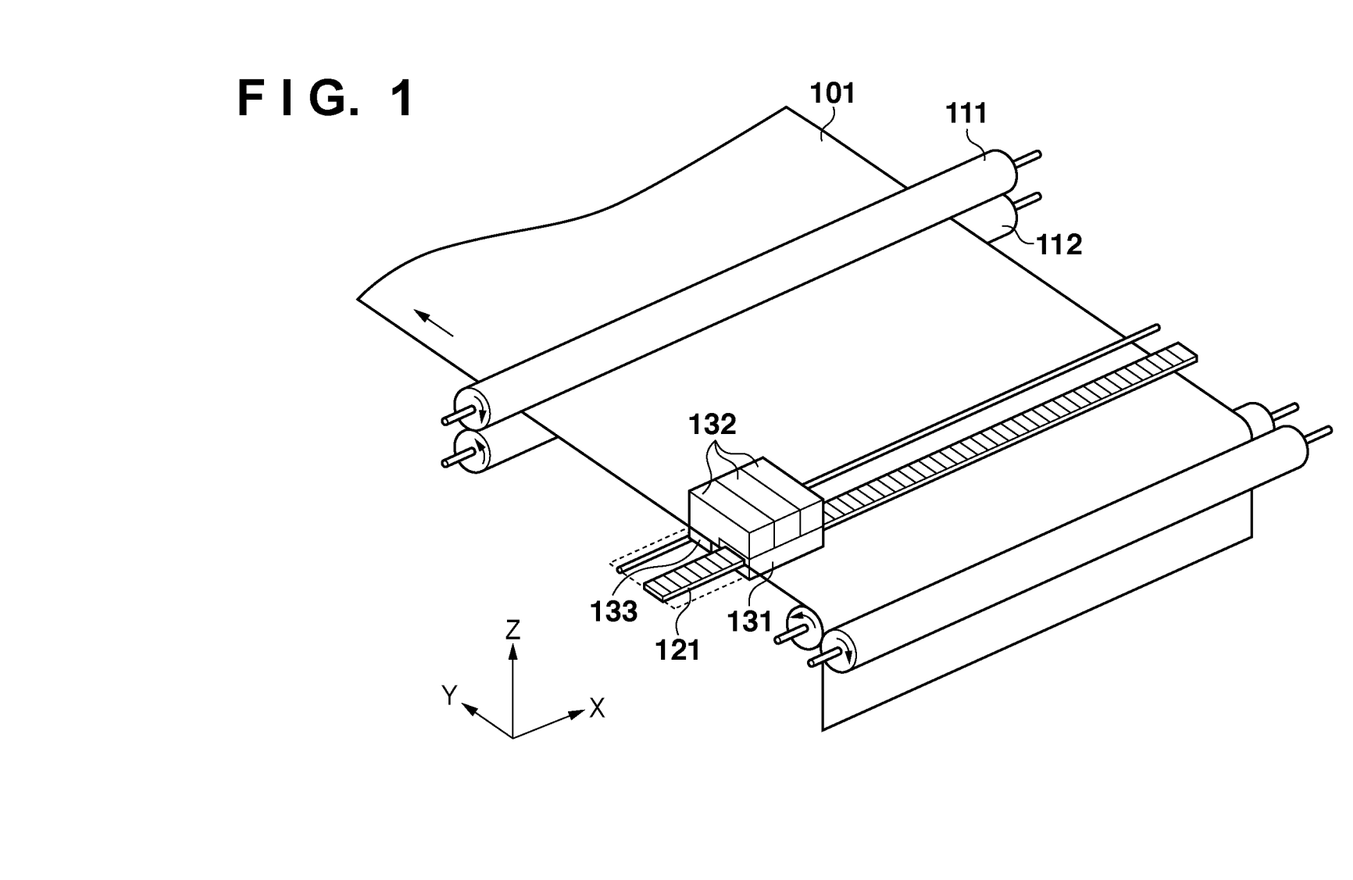
FIG. 1 is a perspective view showing the arrangement of the main part of an inkjet printing apparatus according to the present invention.

FIG. 1 is a schematic perspective view showing the overall arrangement of an inkjet printing apparatus (to be referred to as a printing apparatus) which performs color printing using an inkjet printhead as a typical embodiment of the present invention.

As shown in FIG. 1, the printing apparatus reciprocally scans, in the x direction, a carriage 131 which supports ink cartridges 132 formed from ink tanks respectively containing four color inks (black, cyan, magenta, and yellow), and printheads 133. More specifically, the carriage 131 which supports the ink cartridges 132 slidably engages with a guide shaft 121 and can move in the x direction along the guide shaft 121.

An encoder scale (not shown) is arranged in the x direction on a surface facing the carriage 131, and has slits at an interval of 300 dpi. The encoder scale is irradiated with light emitted by an encoder sensor (not shown), and a signal regarding the scan position of the carriage 131 is output based on the transmission light. The carriage 131 is controlled to stand by at a home position indicated by a dotted line in FIG. 1 when the printing apparatus does not print or the recovery operation of the printhead 133 is performed.

While pressing a printing medium 101 such as printing paper in cooperation with an auxiliary roller 112, a conveyance roller 111 rotates in a direction indicated by an arrow in FIG. 1 to feed the printing medium 101 and convey it in the y direction.

Before the start of printing, while moving in the x direction upon receiving a print start instruction, the carriage 131 at the position (home position) in FIG. 1 drives the printing elements of the printhead 133 to print in a region corresponding to the printing width of the printhead on the printing medium 101. The carriage 131 returns to the home position and prints again in the x direction after the end of printing up to the end of the printing medium in the carriage scan direction (x direction). Before the start of next printing scan after the end of preceding printing scan, the conveyance roller 111 rotates in the direction indicated by the arrow shown in FIG. 1 to convey the printing medium 101 in the y direction by a necessary width. In this manner, scanning of the carriage and conveyance of the printing medium for printing are alternately repeated, completing printing on the entire printing medium. A print operation of discharging ink from the printhead 133 is performed under the control of a printing control circuit (not shown).

To increase the printing speed, printing may be executed not only in forward scan of the carriage but also in backward scan when returning the carriage to the home position after the end of printing in forward scan.

In the above-described example, the ink tank containing ink and the printhead 133 for discharging ink are integrated as the ink cartridge 132. However, the present invention is not limited to this. For example, the ink tank and the printhead 133 may be held on the carriage 131 so that they can be separated. Further, one color printhead capable of discharging a plurality of color inks may be adopted.

A capping mechanism (not shown) for capping the front surface (orifice surface) of the printhead, and a recovery unit (not shown) for performing a head recovery operation to, for example, remove high-viscosity ink and bubbles from the capped printhead are arranged at a position where the recovery operation is performed. A cleaning blade (not shown) or the like is arranged beside the capping mechanism, and supported so that it can project toward the printhead 133 and contact the front surface of the printhead. After the recovery operation, the cleaning blade projects toward the printhead moving path, and wipes away unwanted ink droplets, dirt, and the like from the front surface of the printhead as the printhead moves.

Figure 2:
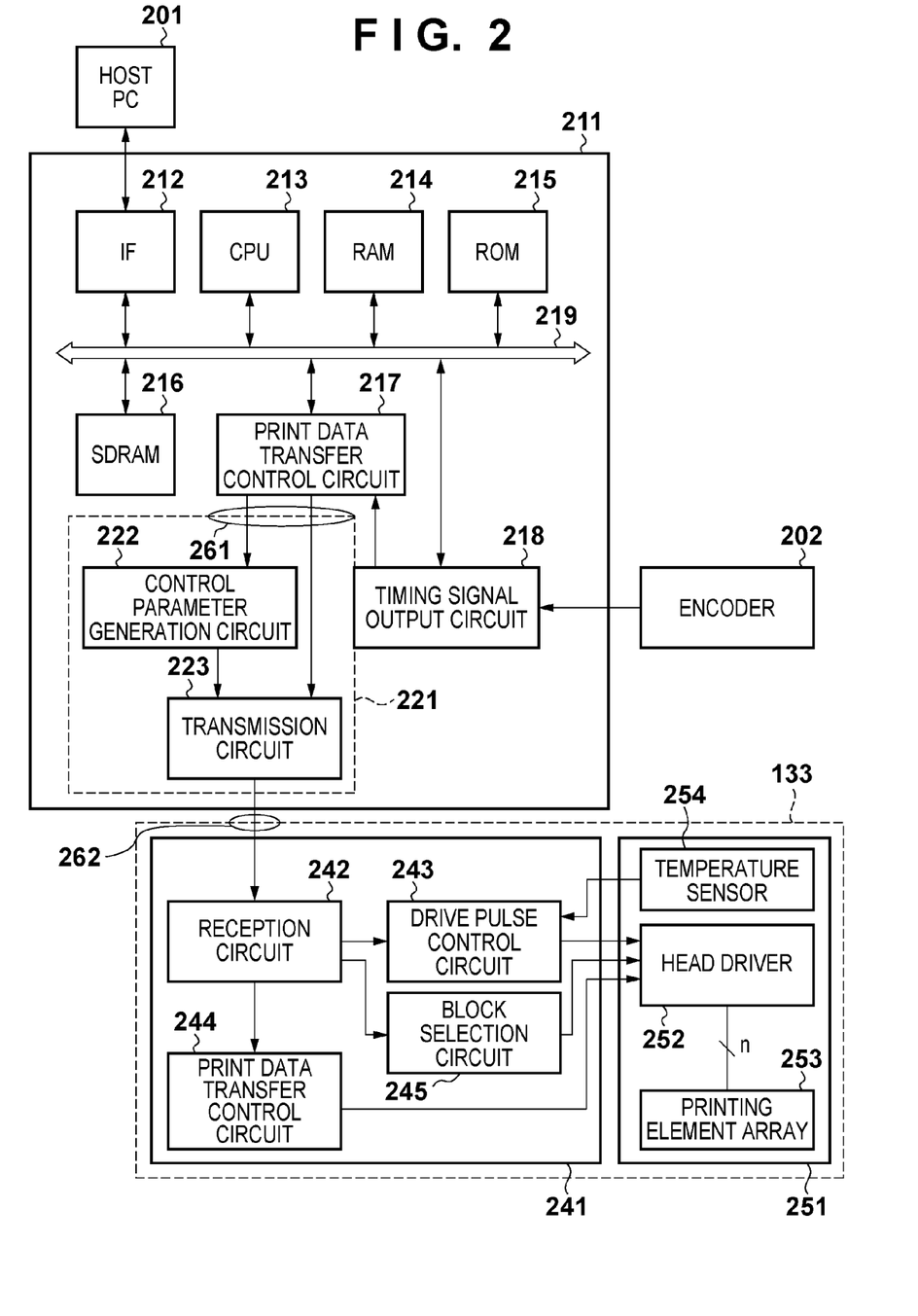
FIG. 2 is a block diagram showing the control arrangement of a printing apparatus shown in FIG. 1.

FIG. 2 is a block diagram showing the control arrangement of the printing apparatus shown in FIG. 1.

Referring to FIG. 2, the position of the carriage 131 can be detected based on a signal output from an encoder 202 formed from an encoder sensor and encoder scale.

Upon receiving the position information signal of the carriage 131 output from the encoder 202, a timing signal output circuit 218 outputs timing signals to a print data transfer control circuit 217 and control parameter generation circuit 222 to operate them.

An SDRAM 216 stores print data transferred from a host computer (HOST PC) 201. The print data transfer control circuit 217 reads print data from the SDRAM 216 in accordance with the timing signal output from the timing signal output circuit 218, and transfers the data to a first head substrate 241. In addition, the print data transfer control circuit 217 generates control information such as block selection information, and transfers it to the first head substrate 241. A drive pulse control circuit 243 controls an integrated normal drive pulse generation circuit 403 (FIG. 4A) to output the normal drive pulse to a second head substrate 251 according to the divided-pulse width modulation driving method. The drive pulse control circuit 243 incorporates even a short pulse generation circuit 402 (FIG. 4A), and keeps the temperature of the entire printhead uniform by applying a pulse short enough not to discharge ink, to the printing element in order to adjust the nozzle temperature (short-pulse heating). The second head substrate 251 includes a temperature sensor 254 for measuring the printhead temperature.

A CPU 213 is connected to the timing signal output circuit 218, SDRAM 216, and print data transfer control circuit 217 via a CPU bus 219. The CPU 213 sets a register regarding printing control of each block except for the SDRAM 216. For the SDRAM 216, for example, the CPU 213 sets mask data when performing multi-pass printing.

The printing apparatus according to the embodiment includes the following arrangement in addition to the CPU 213 for controlling and executing the above-described print operation, image processing regarding generation of print data (to be described later), and the like. More specifically, the printing apparatus includes a ROM 215, a RAM 214, a control unit (not shown) formed from an ASIC, and an interface (I/F) 212 for exchanging print data and various control information with the external host computer (to be referred to as a host) 201. Also, the printing apparatus includes motor drivers (not shown) for driving a carriage motor for carriage driving (not shown), feed motor for feed roller driving (not shown), and conveyance motor for conveyance driving, which form the mechanical part.

The printing apparatus further includes an operation panel (not shown) for inputting control information via a user interface.

The printhead 133 includes a head driver 252 for driving printing elements 253, and a temperature detection element (not shown) arranged inside the printhead. As described above, the printhead 133 includes the first head substrate 241 and second head substrate 251.

It is also possible that a dotted part in a controller 211 is arranged as a control circuit on a relay substrate 221 extending up to the printhead. The relay substrate is mounted on the carriage 131, and a flat flexible cable 261 connects the controller 211 and relay substrate 221. A head contact 262 connects the relay substrate 221 and first head substrate 241. Head control signals transmitted/received between the respective substrates are exchanged as serial signals.

The relay substrate 221 includes the control parameter generation circuit 222 and a transmission circuit 223. The first head substrate 241 includes a reception circuit 242, the drive pulse control circuit 243, a print data transfer control circuit 244, and a block selection circuit 245. These components will be described in detail later.

In the embodiment, the printhead temperature is controlled using short-pulse heating.

In the embodiment, each chip on the printhead is controlled to reach the target temperature at the timing before the first printing scan in continuous scan printing when the carriage stays outside the printing region before the first printing scan upon cap opening and after the next printing scan (during printing scan).

Figure 3A:
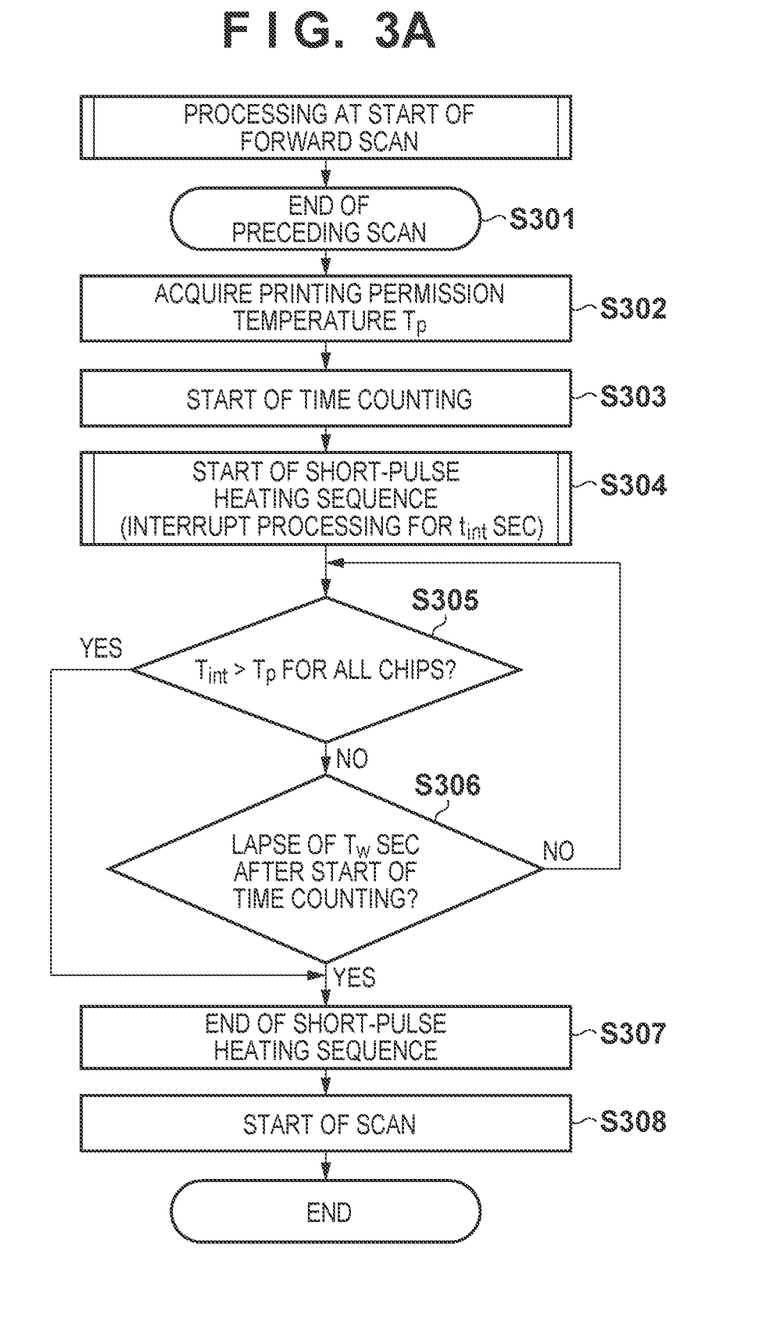
FIG. 3A is a flowchart showing temperature retaining control processing at the start of forward scan of a carriage.

FIG. 3A is a flowchart showing temperature retaining control processing executed at the start of forward scan of the printhead. Note that even temperature retaining control processing at the start of backward scan is also the same. These control operations are repeated in the next and subsequent scans.

When preceding scan ends in step S301, the process advances to step S302 to acquire a set printing permission temperature Tp [C.°]. Time counting starts in step S303, and a short-pulse heating sequence starts in step S304.

The short-pulse heating sequence executes interrupt processing in every $t_{int}$ [sec] based on the internal timer of the CPU 213. After the start of interrupt processing, in step S305, the internal temperature Tint [C.°] of the printhead is obtained from a signal from the temperature detection element, and it is determined whether the internal temperature Tint [C.°] has exceeded the printing permission temperature Tp [C.°]. The temperature is determined for every head chip corresponding to each color ink. If Tint≤Tp, short-pulse heating is set ON. In step S306, the time elapsed after the start of time counting is checked. If the elapsed time is equal to or shorter than Tw

[sec], the process returns again to step S305. If Tw [sec] has elapsed after the start of time counting, the process advances to step S307 to end the short-pulse heating sequence. If Tint>Tp, the process advances to step S307 to end the short-pulse heating sequence.

In this way, the short-pulse heating sequence ends when Tint>Tp, and the process advances to step S308. Even if Tint≤Tp, the short-pulse heating sequence ends regardless of the temperature state upon the lapse of Tw [sec] after the start of time counting. In step S308, scan of the carriage starts, and printing starts.

When short-pulse heating is set ON in the short-pulse heating sequence, a control parameter generated by the control parameter generation circuit 222 is used to supply the short pulse from the drive pulse control circuit 243 to the printhead 133.

Figure 3B:
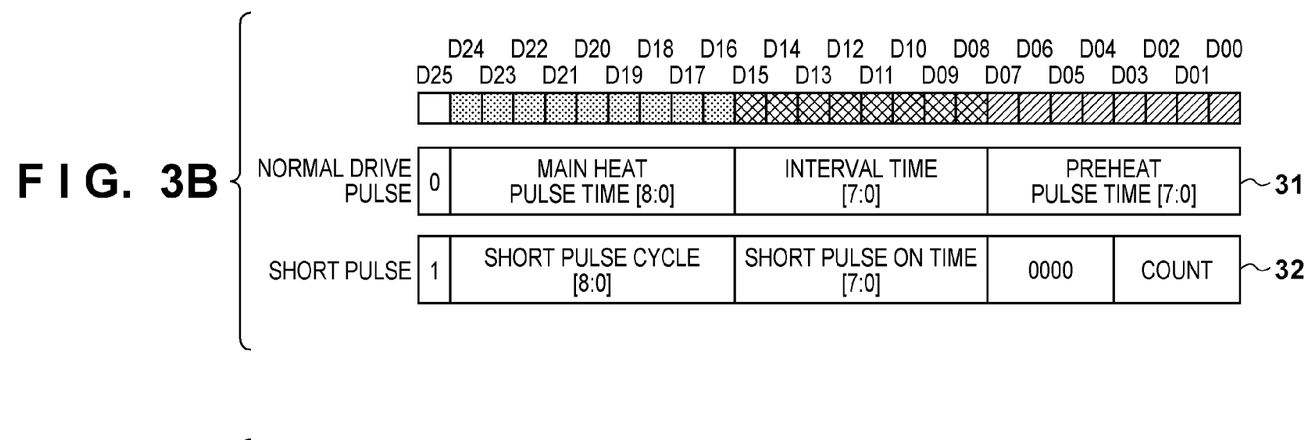
FIG. 3B is a view showing the data bit array of a control parameter generated by the processing shown in FIG. 3A.

FIG. 3B is a view showing the data bit array of a control parameter generated by the control parameter generation circuit 222.

When short-pulse heating is set ON in the short-pulse heating sequence, 26-bit short pulse data 32 is generated based on a short pulse control parameter set in advance by the control parameter generation circuit 222. The data is generated by assigning, as data of bit D25, to data of 25 bits D0 to D24 of the data bit array shown in FIG. 3B, an identification code (value "1") indicating that this pulse is the short pulse. In this fashion, D0 to D25 of the data bit array are generated as input data to the drive pulse control circuit 243. The set values of the short pulse count, ON time, and cycle are stored in D0 to D7, D8 to D15, and D16 to D24 of the data bit array, respectively.

After the start of carriage scan, 26-bit discharge data 31 is generated based on a normal drive pulse control parameter serving as each pulse table set selected based on the dot count of print data in the control parameter generation circuit 222. The data is generated by assigning, as data of bit D25, to 25 bits D0 to D24 of the data bit array, an identification code (value "0") indicating that this pulse is a normal drive pulse. Accordingly, D0 to D25 of the data bit array are generated as input data to the drive pulse control circuit 243. The set values of the preheat pulse time P1, interval time P2, and main heat pulse time P3 are stored in D0 to D7, D8 to D15, and D16 to D24 of the data bit array, respectively. Note that the normal drive pulse is also known as a double pulse.

Note that a control parameter for generating the double pulse (normal drive pulse) will be called the first control parameter, and a control parameter for generating the short pulse will be called the second control parameter. As is apparent from FIG. 3B, the first and second control parameters have the same data size, and their identification codes are assigned at the same bit position. An identification code value "0" represents that the control parameter is the first control parameter. An identification code value "1" represents that the control parameter is the second control parameter.

The identification code of bit D25 is used to change control parameter processing within the control circuit of the first head substrate 241, which will be described later.

The transmission circuit 223 adds an error detection code, latch code, and the like to the data bit array of these control parameters generated by the control parameter generation circuit 222, and transfers them as serial data to the first head substrate 241. Note that the transmission circuit 223 transfers even block selection information as serial data to the first head substrate 241.

The data transfer line of the head contact 262 which connects the relay substrate 221 and first head substrate 241 includes a heat data transfer line for transferring the control parameters of the normal drive pulse and short pulse, and a print data transfer line for transferring a print data signal. Hence, two data transfer lines exist between the relay substrate 221 and the first head substrate 241.

In the embodiment, the printing element array of the printhead is driven time-divisionally. In the time-division driving, a plurality of printing elements forming a printing element array are divided into given units (blocks), and simultaneously driven in each division unit. By temporally changing a block to be driven, all printing elements forming the printing element array are driven. The block selection circuit 245 shown in FIG. 2 transfers block selection information to the head driver 252. Based on the block selection information, the head driver 252 selects a block to be driven, and outputs the drive pulse to printing elements belonging to the selected block.

In the embodiment, an ink of one color is discharged to print, for descriptive convenience. However, when inks of a plurality of colors are discharged to print, a heat data signal and print data signals are generated and transferred for each block of the nozzle array of every ink color. Hence, even the two data transfer lines are prepared by the number of ink colors. As another approach, a single data transfer line may be used to time-divisionally transfer data for respective colors.

The operation of the printhead which receives a signal transferred from the printing apparatus main body in the above-described manner will be explained.

The reception circuit 242 of the first head substrate 241 receives serially transferred signals, and executes conversion of the received serial data into parallel data, error detection, and the like. Then, the drive pulse control circuit 243 performs control parameter processing. The reception circuit outputs a low-level identification code signal when the identification code value is "0", and a high-level identification code signal when it is "1".

Figure 4A:
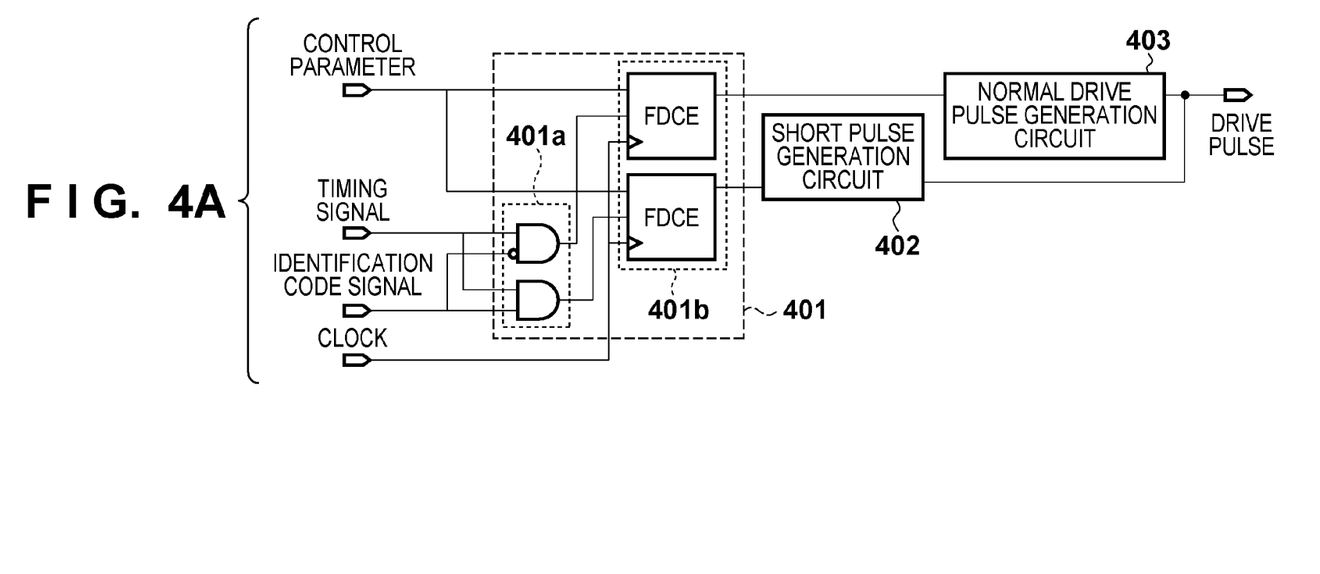
FIG. 4A is a block diagram showing the detailed arrangement of a drive pulse control circuit.

FIG. 4A is a block diagram showing the detailed arrangement of the drive pulse control circuit 243. As shown in FIG. 4A, the drive pulse control circuit 243 includes a control parameter switching circuit 401 surrounded by a broken line, the normal drive pulse generation circuit (first pulse generation circuit) 403, and the short pulse generation circuit (second pulse generation circuit) 402. The control parameter switching circuit 401 receives a parallel control parameter, timing signal, identification code signal, and clock signal from the reception circuit 242. The control parameter switching circuit 401 includes a logical circuit 401a and flip-flop 401b. The logical circuit 401a switches the control parameter input destination to either the normal drive pulse generation circuit 403 or short pulse generation circuit 402 in accordance with an identification code signal corresponding to the identification code value. The control parameter switching circuit 401 transfers the short pulse data 32 to the short pulse generation circuit 402 when the identification code signal is at high level. In accordance with the contents of the short pulse data 32, the short pulse generation circuit 402 generates a drive pulse for the short pulse in synchronism with the timing signal. The control parameter switching circuit 401 transfers the discharge data 31 to the normal drive pulse generation circuit 403 when the identification code signal is at low level. Supplementarily speaking, the logical circuit 401a calculates a logical product of the timing signal and the identification code signal, and outputs the calculation result to the flip-flop 401b. The flip-flop 401b latches a control parameter at a timing of inputting the preceding timing signal, and outputs the latched control parameter at a timing of inputting the next timing signal.

The short pulse generation circuit 402 generates a short pulse.

Figure 4B:
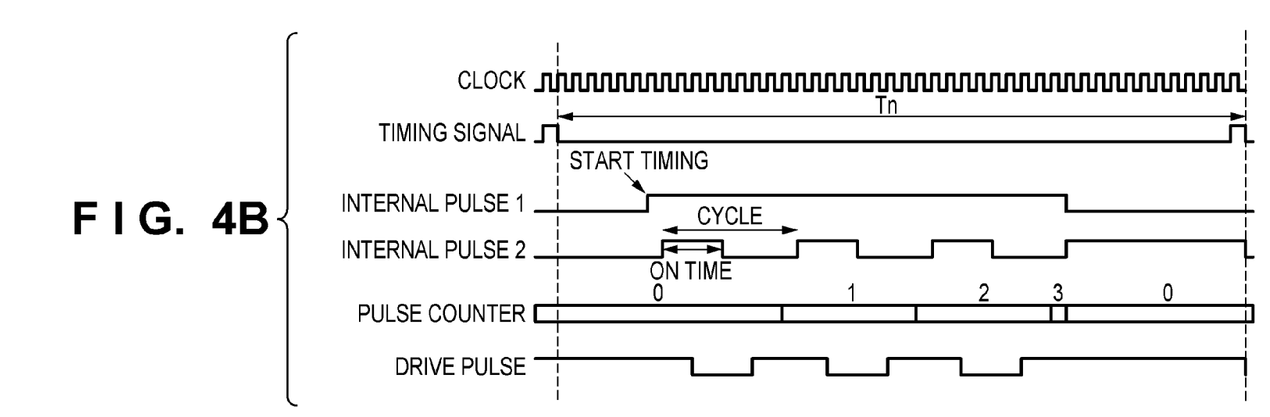
FIG. 4B is a timing chart for explaining a short pulse.

FIG. 4B is a timing chart for explaining a short pulse.

In FIG. 4B, internal pulse 2 is a pulse which is generated in accordance with the set drive cycle and drive duty (ON time). Internal pulse 1 is a pulse which is negated when the internal pulse 2 reaches the set count after the internal pulse 1 is asserted at a set start position. The short pulse generation circuit 402 includes a pulse counter for counting the internal pulse 2. In the example shown in FIG. 4B, the internal pulse 1 is negated when the internal pulse 2 is repeated three times. A pulse synthesized by calculating the logical product of two pulses, that is, the internal pulse 1 and the internal pulse 2 is supplied as the short pulse to the printhead 133.

Note that the printhead 133 divides all printing elements (heaters) into 20 blocks, and time-divisionally drives the respective blocks. By setting the drive frequency Fop, the cycle Tn for driving each heater is determined.

Figure 4C:
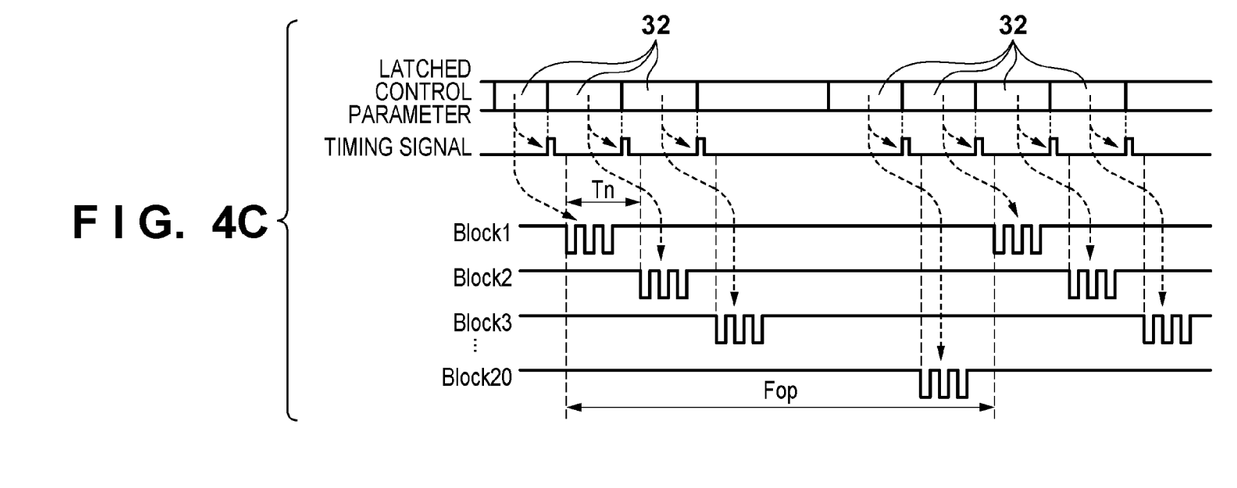
FIG. 4C is a timing chart showing the relationship between the drive frequency of the printhead and the drive time and drive pulse for each block.

FIG. 4C is a timing chart showing the relationship between the drive frequency Fop, the block time Tn serving as the drive time of each block, the timing when the reception circuit 242 generates a timing signal, and the timing of the short pulse applied from the head driver 252 to each block. Note that the reception circuit 242 generates a timing signal in synchronism with reception of the control parameter (short pulse data 32). As indicated by arrows, the head driver 252 outputs drive pulses in correspondence with the contents of the short pulse data 32. As described above, the block selection circuit 245 selects a block of the printing element array. In a period corresponding to the drive frequency Fop, drive pulses generated by the short pulse generation circuit 402 are sequentially supplied from block 1 (Block1) to block 20 (Block20).

According to the above-described embodiment, identification codes are assigned to the control parameters of the normal drive pulse and short pulse, respectively. The control parameters are transferred to the control circuit of the head substrate using a single signal line. In accordance with the identification code value, either the normal drive pulse or short pulse is generated within the printhead. The control circuit in the printhead drives the head driver based on the generated pulse, thereby driving the printing element (heater) of the printhead.

According to the embodiment, the control parameters of the normal drive pulse and short pulse can be transferred using a single signal line. Only the bit length increases by the identification code, and the number of signal lines does not increase. Therefore, the number of head contacts of the printhead does not increase, contributing to downsizing of the printhead. The transfer signal amount does not greatly increase, so the data transfer time does not become longer, contributing to even high-speed control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-032627, filed Feb. 17, 2011, which is hereby incorporated by reference herein in its entirety.

What is claimed is:

1. An inkjet printhead comprising:
   a plurality of heaters;
   a driving unit configured to drive said plurality of heaters;
   a reception unit configured to receive, together with an identification code from outside via a single signal line, a first control parameter for discharging ink and a second control parameter for heating said heaters so as not to discharge ink;
   a first pulse generation unit configured to generate a pulse to be supplied to said driving unit based on the first control parameter;
   a second pulse generation unit configured to generate a pulse to be supplied to said driving unit based on the second control parameter; and
   a supply unit configured to supply the first control parameter to said first pulse generation unit and the second control parameter to said second pulse generation unit based on the identification code.

2. The inkjet printhead according to claim 1, wherein said first pulse generation unit generates a plurality of pulses based on the first control parameter, and said second pulse generation unit periodically generates a single pulse at a predetermined interval based on the second control parameter.

3. The inkjet printhead according to claim 2, wherein the first control parameter contains information of drive times of the respective pulses and information of a time interval between the plurality of pulses, and the second control parameter contains information of a drive time of the single pulse, information of a cycle of the single pulse, and information of a drive count.

4. A printing apparatus including an inkjet printhead according to claim 1, comprising:
   a generation unit configured to generate the first control parameter and the second control parameter; and
   a transfer unit configured to serially transfer the first control parameter or the second control parameter generated by said generation unit to the inkjet printhead using a single signal line.

* * * * *